United States Patent
Khan et al.

(10) Patent No.: US 12,423,759 B2
(45) Date of Patent: Sep. 23, 2025

(54) SYSTEM AND METHOD FOR CYBERSECURITY RISK MONITORING AND EVALUATION IN CONNECTED AND AUTONOMOUS VEHICLES

(71) Applicant: King Saud University, Riyadh (SA)

(72) Inventors: Muhammad Khurram Khan, Riyadh (SA); Wazir Zada Khan, Wah Cantt (PK); Misbah Khan, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 19/007,141

(22) Filed: Dec. 31, 2024

(65) Prior Publication Data

US 2025/0139709 A1     May 1, 2025

Related U.S. Application Data

(63) Continuation-in-part of application No. 18/124,473, filed on Mar. 21, 2023, now Pat. No. 11,874,752.

(51) Int. Cl.
    *G06Q 40/08*     (2012.01)
    *G06F 21/57*     (2013.01)

(52) U.S. Cl.
    CPC .......... *G06Q 40/08* (2013.01); *G06F 21/577* (2013.01)

(58) Field of Classification Search
    CPC .............................. G06Q 40/08; G06F 21/577
    See application file for complete search history.

(56) References Cited

U.S. PATENT DOCUMENTS

| | | | |
|---|---|---|---|
| 10,482,003 B1 * | 11/2019 | Bondor | G06F 11/3684 |
| 11,210,739 B1 | 12/2021 | Deluca et al. | |
| 11,271,971 B1 | 3/2022 | Khan et al. | |
| 11,468,215 B2 | 10/2022 | Shiraishi et al. | |
| 11,874,752 B1 | 1/2024 | Khan et al. | |
| 12,202,517 B2 * | 1/2025 | Levy | G06F 21/554 |
| 2016/0285907 A1 * | 9/2016 | Nguyen | H04L 63/1433 |
| 2018/0205754 A1 | 7/2018 | North | |
| 2018/0210726 A1 * | 7/2018 | Jun | G06F 8/71 |
| 2019/0036948 A1 * | 1/2019 | Appel | G06N 20/00 |
| 2019/0287079 A1 * | 9/2019 | Shiraishi | G07C 5/0841 |
| 2020/0174779 A1 * | 6/2020 | David | G06F 8/654 |
| 2021/0213846 A1 | 7/2021 | Sun et al. | |
| 2021/0256616 A1 * | 8/2021 | Hayward | G06V 30/274 |
| 2022/0129990 A1 * | 4/2022 | Roudaut | H04L 63/1433 |
| 2022/0150270 A1 * | 5/2022 | Klein | G06F 11/3457 |
| 2022/0394053 A1 | 12/2022 | Sorani et al. | |
| 2022/0400382 A1 * | 12/2022 | Hernández Palmero | H04W 12/30 |
| 2023/0074139 A1 | 3/2023 | Ghosh et al. | |
| 2023/0401453 A1 * | 12/2023 | Ameyugo | G06N 3/08 |
| 2024/0264929 A1 * | 8/2024 | He | G06F 21/577 |

FOREIGN PATENT DOCUMENTS

| | | |
|---|---|---|
| JP | 6825634 B2 | 2/2021 |
| WO | 2023011798 A1 | 2/2023 |

* cited by examiner

*Primary Examiner* — Matthew S Gart
*Assistant Examiner* — William D Newlon

(57) ABSTRACT

Systems and methods with improving the cybersecurity of connected and autonomous vehicles (CAVs) through the use of a digital twin are disclosed. The system collects real-time data from vehicle sensors and updates statuses of electronic control units (ECUs) to generate a digital twin. The system simulates vehicle behavior and cybersecurity threats to generate predictive cybersecurity indicators (PCIs) and identify potential vulnerabilities. The system adjusts insurance premiums for the vehicle based on the PCIs.

14 Claims, 9 Drawing Sheets

SYSTEM AND METHOD FOR CYBERSECURITY RISK MONITORING AND EVALUATION IN CONNECTED AND AUTONOMOUS VEHICLES

FIELD OF THE INVENTION

The present invention relates generally to vehicle cybersecurity management. The present invention relates more specifically to monitoring and evaluating cybersecurity risk or identifying potential risk associated with an insecure connected autonomous vehicle (CAV) using a digital twin.

BACKGROUND OF THE INVENTION

Often, connected autonomous vehicles that are not actively updated or managed can lead to vehicle malfunctioning or even vehicle accidents due to cyber-attacks. One significant contributing factor to connected autonomous vehicle accident is the failure of one or more systems of the CAV resulting from routine use. As such, vehicles need to be continuously monitored and updated to combat potential cybersecurity attacks and risks. The market for connected and autonomous vehicles (CAV) is projected to experience significant growth in the coming years. According to The Business Research Company, the global market for connected and autonomous mobility vehicles is expected to grow from $133.03 billion in 2023 to $197.56 billion in 2024, with a compound annual growth rate (CAGR) of 48.5%. By 2028, the market is forecasted to reach $824.41 billion, driven by advancements in technology, increasing consumer acceptance, and regulatory support. Today, more than a million CAVs are on US roads and will be projected to 18 million by 2030. With about 67 percent of all new vehicles sold in 2020 being connected in some way, this trend is not expected to slow down, but to rise to 100 percent by 2026. While autonomous vehicles (CAVs) hold great promise for the transportation industry, they also present rising cybersecurity challenges. The increasing sophistication of CAV technology has led to a rise in cybersecurity attacks and an increased risk of CAV hacking. Applications, firmware, and computer algorithms that are pre-programmed into different Electronic Control Units (ECUs) constitute the foundation for many of the features of connected CAVs. Today's modern CAVs are heavily relaying on ECU. Each ECU is responsible for controlling functional part of AVs. AVs contain more than 100 ECUs. These ECUs are vulnerable to cyber-attacks if their software and firmware are not properly updated. Cybercriminals may endanger the lives of CAV passengers by jamming the control systems of the vehicle, which might result in the disabling of the brakes, the shutting off of the headlights, or the seizing of control of the steering. A connected but not updated autonomous vehicle is at serious cybersecurity risk. Therefore, safety-critical software-dependent systems in CAVs, like steering, braking, and acceleration, must be updated right away to fix vulnerabilities in order to ensure continued safety and security. In order to improve software functionality, patch vulnerabilities, and correct defects, the various ECUs, software, applications, and services in these networked CAVs also require periodic upgrades and remote cybersecurity diagnostic. While it is clear from the introduction of WP 29 regulation and ISO/SAE 21434 standard that regulators are challenging automotive manufacturers to consider the cybersecurity elements of their future vehicles, automakers and suppliers are tasked with finding their own way around this challenge, to make sure they secure the cars of our future.

A significant issue with modern vehicles is that owners often neglect routine maintenance, including important security updates. For instance, when a vehicle issues a security update alert, the owner might ignore it, believing these updates are not critical. More importantly, responding to these alerts usually requires the owner to take their car to a service center or dealer shop, which can be inconvenient. This negligence increases the risk of cybersecurity threats and potential attacks. Additionally, unsecure vehicles are at a higher risk of accidents, which can lead to increased losses. Insurance companies may respond to this by charging higher premiums or adjusting policies for vehicles deemed to be inadequately secured. To address this, a more reliable system is needed that not only provides accurate update alerts but also simplifies the process of maintaining vehicle security, helping to ensure vehicles remain secure and reducing the associated insurance costs.

SUMMARY OF THE INVENTION

Systems, methods, and other embodiments associated with improving the cybersecurity of connected and autonomous vehicles (CAVs) through the use of digital twin are disclosed. As mentioned previously, while CAVs are becoming more common, connected autonomous vehicles have the potential to increase the landscape of cyber threats. Moreover, the connected autonomous vehicles and, in particular, application and the ECUs of these vehicles are a source that can be leveraged to attack or at least cause some of the noted difficulties. In one embodiment, example systems and methods relate to a manner of using digital twin to monitor the connected autonomous vehicle and subsequently check for cybersecurity threats. For example, digital twin are normally used for improving design, ensuring safety, enhancing performance, enabling predictive maintenance, and supporting the development of advanced features through simulation and real-time data analysis but may be used in different ways, remote cybersecurity diagnostics and for checking software security patches, and firmware updates for ECUs using data provided by particular manufacturer, vendor and service providers, and so on for a connected autonomous vehicle or a fleet of connected autonomous vehicles.

DETAILED DESCRIPTION OF THE INVENTION

Figure 1:
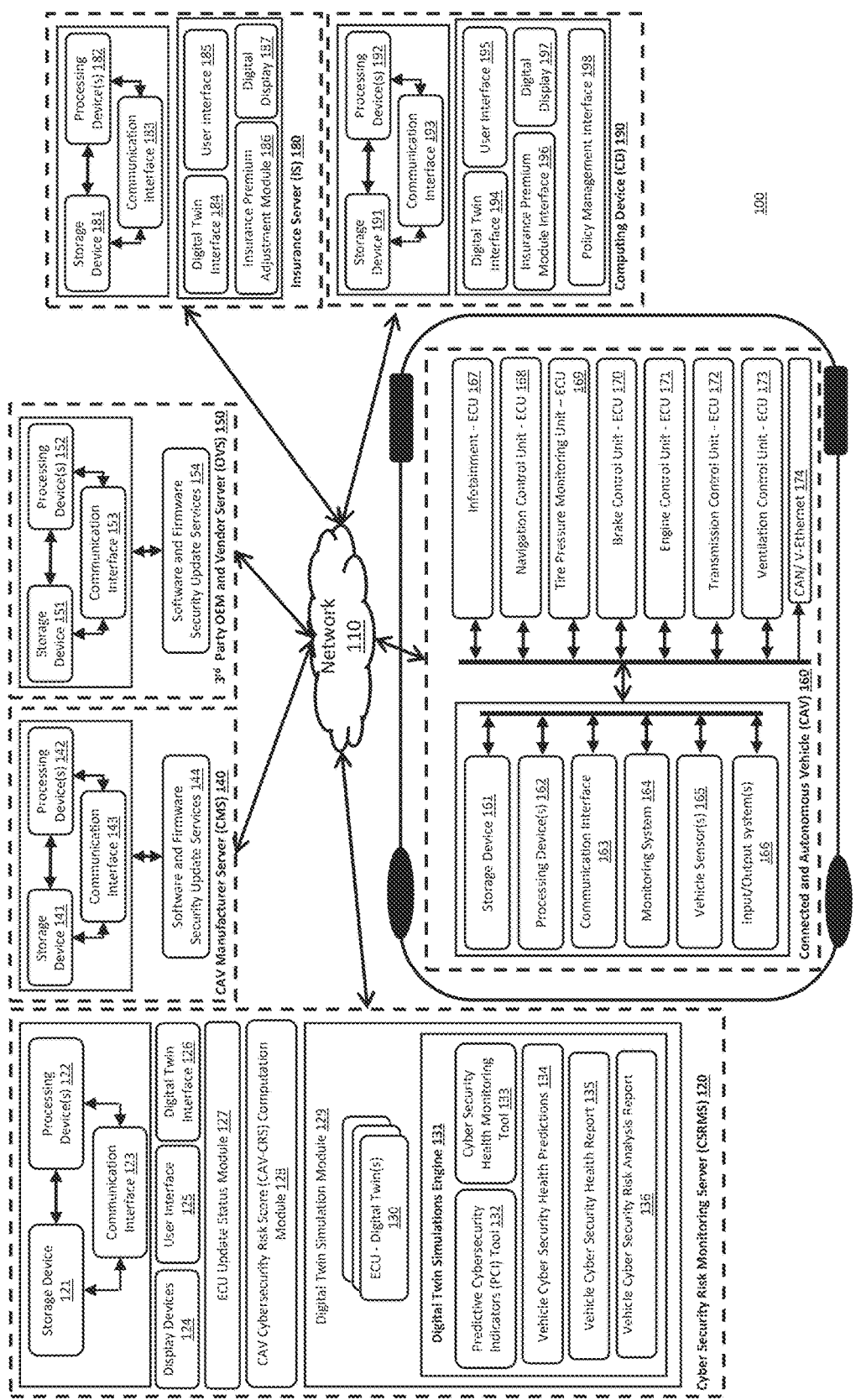
FIG. 1 is a schematic diagram of a system for monitoring and evaluating cybersecurity risk using Digital Twin of a CAV

All illustrations of the drawings are for the purpose of describing selected versions of the present invention and are not intended to limit the scope of the present invention.

The accompanying drawings, which are incorporated in and constitute a part of this disclosure, illustrate various embodiments of the present disclosure. In some embodiments, one element may be designed as multiple elements or multiple elements may be designed as one element. In some embodiments, an element shown as an internal component of another element may be implemented as an external component and vice versa. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments and elements may not be drawn to scale, detailed in the present disclosure.

Described herein are embodiments of a digital twin system. In some embodiments, the digital twin system beneficially builds a digital twin of a real-world connected autonomous vehicle (CAV) or a fleet of connected autonomous vehicles and then updates the status of the digital twin in real-time or near real-time based on the ECUs or sensor data that is recorded by the real-world connected autonomous vehicle's onboard ECUs and sensors. In this way, the digital twin describes the real-time cybersecurity status or near real-time cybersecurity status of the real-world connected autonomous vehicle or a fleet of connected autonomous vehicles.

In some embodiments, the digital twin system knows the cybersecurity state of at least one particular electronic control unit (ECU) of a plurality of electronic control units (ECUs) associated with the connected autonomous vehicles when they are new (i.e., their "new state") based on the vehicle models for each model of one or more real-world connected autonomous vehicles. For example, the digital twin system has access to connected autonomous vehicle manufacturer's server for the connected autonomous vehicle's models for some or all of the real-world connected autonomous vehicles manufactured by the particular connected autonomous vehicle manufacturer. The real-world vehicle may be referred to below as a "connected autonomous vehicle (CAV)" or a fleet of "connected autonomous vehicles."

In some embodiments, the digital twin system monitors a cybersecurity health status of a connected and autonomous vehicle (or a fleet of connected autonomous vehicles) based on one or more of the following: (1) onboard data which is collected through Monitoring Module from at least one particular electronic control unit (ECU) of a plurality of electronic control units (ECUs) or onboard sensors of the connected autonomous vehicle; and (2) measured data which is collected through ECU Update Status Module from a connected autonomous vehicle's manufacturer server or vice versa; and (3) measured data which is collected through ECU Update Status Module from a connected autonomous vehicle's $3^{rd}$ party service providers or vice versa.

In some embodiments, the ECU Update Status Module compares the current ECU data with update information from manufacturers to determine the vehicle's update status and identify any vulnerabilities. Moreover, it also describes the depreciation/appreciation/EOL/EOS of the connected autonomous vehicle or specific ECU or ECU's firmware or software of the connected autonomous vehicle.

In some embodiments, the CAV Cybersecurity Risk Score (CAV-CRS) Computation Module describe information that is relevant for determining a risk factors of the CAV. The Cybersecurity Risk Score (CAV-CRS) is a comprehensive metric designed to evaluate the cybersecurity risk associated with the various Electronic Control Units (ECUs) within a connected or autonomous vehicle. The CAV-CRS considers multiple critical factors, including the update status, the criticality, sensitivity, likelihood of attack, risk weighting and the impact of each ECU on overall vehicle operation. Further, the processing device may be configured for determining a CAV Cybersecurity Risk Score (CAV-CRS) for each ECU of the plurality of ECUs based on the applying.

In some embodiments, the ECU Update Status Module describes information that is relevant for determining an insurance plan for an insurance policy based on cybersecurity health status of a particular connected autonomous vehicle (CAV) or a fleet of connected autonomous vehicles. Examples of ECU Update Status include, among other things, one or more of the following: the current status software update or firmware update or security update of at least one particular electronic control unit (ECU) of a plurality of electronic control units (ECUs); and the average frequency of software update or firmware update or security update of at least one particular electronic control unit (ECU) of a plurality of electronic control units (ECUs); End of Life (EOL) of a ECU or Sensor or "End of Support" or "End of Service" (EOS) of software or firmware of a ECU or vehicle system from the manufacturer. In some embodiments, the CAV Cybersecurity Risk Score (CAV-CRS) Computation Module describes information that is relevant for determining an insurance plan for an insurance policy based on CAV Cybersecurity Risk Score (CAV-CRS) of a particular connected autonomous vehicle (CAV) or a fleet of connected autonomous vehicles.

In some embodiments, new instances of the ECU Update Status and the CAV Cybersecurity Risk Score (CAV-CRS) are repeatedly received by the digital twin system over a period of time. The state of each monitored connected autonomous vehicle is updated by the digital twin system based on instances of the ECU Update Status and the CAV Cybersecurity Risk Score (CAV-CRS) that are received over the period of time, thereby enabling the digital twin system to track the cybersecurity health status of the connected autonomous vehicle and whether on board sensors or firmware or software at least one particular electronic control unit (ECU) of a plurality of electronic control units (ECUs) associated with the CAV will need to be updated or replaced in the near future based on their current known state and known lifecycle as indicated by the vehicle model for the connected autonomous vehicle or EOS or EOL prescribed by the manufacturer of autonomous vehicle or vendor of ECU hardware or software.

In some embodiments, the digital twin system provides this service for a fleet of vehicles of various makes and models, and in this way, tracks the specific cybersecurity status of specific vehicles within the fleet.

In some embodiments, the Digital Twin Simulation Module provides this cybersecurity update service for at least one particular electronic control unit (ECU) of a plurality of electronic control units (ECUs) for a fleet of vehicles of various makes and models, and in this way, tracks the specific cybersecurity condition of specific vehicles within the fleet.

In some embodiments, the Digital Twin Simulation Module is responsible for generating a virtual replica, or "digital twin," of the vehicle. This twin serves as a dynamic and real-time representation of the CAV, reflecting the current state of all its subsystems, including the Electronic Control Units (ECUs), firmware, software versions, and operational data. The module utilizes this digital twin to run cybersecurity simulations and predict future vulnerabilities, enabling preventive measures to be taken before real-world issues arise. It integrates the CAV Cybersecurity Risk Score (CAV-CRS) Computation Module, data from the Monitoring Module, and ECU Update Status Module to provide an accurate representation of the CAV's current and future cybersecurity health. In some embodiments, the Digital Twin Simulation Module will simulate the real-time status of the CAV based on current data and predict future risks. It achieves this by using the CAV-CRS and calculate the predictive cybersecurity indicators (PCI) to model potential threats and vulnerabilities that could affect the vehicle.

In some embodiments, the Digital Twin Simulation Module will first generate the Current Model or Real-time Model of the CAV, based on data received from the Monitoring Module, which includes ECU data, vehicle operational data, environmental data, user-generated data, and the current location of the vehicle. The Digital Twin Simulation Module will then generate Updated Model, after receiving the CAV's cybersecurity risk score through CAV-CRS Computation Module and updated ECUs status through ECU Update Status Module. The Updated Model will generate the updated version of the CAV that will reflect the potential vulnerabilities or threats after incorporating the CAV-CRS. In some embodiments, the Digital Twin Simulation Module will also generate Predictive Cybersecurity Indicators (PCI) by using predictive algorithms to calculate potential future risks. The PCI are based on simulated attacks and vulnerabilities.

In some embodiments, The Digital Twin Simulation Module, after receiving the data from Monitoring Module, and ECU Update Status Module, the Digital Twin Simulation Module will simulate various scenarios, predicting how the vehicle will respond to different cybersecurity risks. The module can simulate specific attack vectors, such as unauthorized access to a particular ECU or a network-based denial of service attack. By evaluating how the vehicle's systems perform under different simulated conditions, the module can help identify vulnerabilities before they are exploited in real-world scenarios. By evaluating how the vehicle's systems perform under different simulated conditions, the module can help identify vulnerabilities before they are exploited in real-world scenarios.

In some embodiments, the Digital Twin Simulation Module run predictive simulations using machine learning, deep learning and artificial intelligence algorithms. These algorithms analyze historical attack patterns, real-time data, and ECU vulnerabilities to predict future risks. By simulating various "what-if" scenarios, the system can identify potential attack vectors and vulnerabilities long before they occur in real-world settings.

In some embodiments, the Digital Twin Simulation Module will use PCI and CAV-CRS data to model (1) how the vehicle will perform in case of any cyber-attack and (2) how the autonomous vehicle will behave in the future based on the current state of the vehicle as indicated by the autonomous vehicle cybersecurity health status for that real-world vehicle and the cybersecurity vulnerabilities of the ECU(s), Firmware(s) and software(s) as described by the remote cyber diagnostics.

Software, firmware, hardware, or a mix of these installed on the computing device that causes or causes the computing device to execute the operations. This allows a system consisting of one or more computing device to be programmed to carry out certain tasks or actions. By adding instructions that, when carried out by data processing devices, cause the apparatus to carry out the operations, one or more computer programs can be set up to carry out certain tasks or actions.

A general approach comprises the following steps: creating a digital twin of the connected autonomous vehicle; receiving digital data captured by an ECU or sensor and characterizing its real-world cybersecurity health state and diagnostics; and updating the vehicle's digital twin in response to the digital data in order to ensure that it matches the real-world cybersecurity health condition and diagnostics. Corresponding computer systems, devices, and computer programs stored on one or more computer storage devices and each designed to carry out the operations of the methods are other embodiments of this feature.

In some embodiment disclosed herein is a Monitoring Module inside connected autonomous vehicles (CAV) for facilitating managing cybersecurity health of a CAV. The Monitoring Module may include one or more processing devices and a memory communicably coupled to the one or more processors. The memory stores a connection module of the CAV include instructions that when executed by the one or more processing devices cause the one or more processing devices to, in response to detecting establishment of a connection between a CAV and a digital twin, determine attributes of the connection with the digital twin that indicate at least a relationship between a CAV and its digital twin. The memory instructions that when executed by the one or more processors cause the one or more processors to scan the firmware of at least one electronic control unit (ECU) of a plurality of electronic control units (ECUs) associated with the CAV. Further, the processing device may be configured for determining a security update status for each ECU of the plurality of ECUs based on the applying. Further, the Monitoring Module including instructions that when executed by the one or more processors cause the one or more processors to sending scan update status of at least one electronic control unit (ECU) of a plurality of electronic control units (ECUs) associated with the CAV to the Monitoring Module of the digital twin through connection module. Further, the Monitoring Module of CAV may include a storage device communicatively coupled with the processing device. Further, the memory store the digital data recorded by an ECU or sensor and describing a condition of a CAV as it exists in a real-world a status of the vehicle when operated in the real-world; and a processor that is communicatively coupled to the non-volatile memory, where the non-volatile memory stores instructions which, when executed by the processor, causes the processor to generate a digital twin of the vehicle, and update the digital twin of the vehicle based on the digital data so that the digital twin is consistent with the current cybersecurity status. The memory stores instructions that when executed by the one or more processors cause the one or more processors to receive information from the Monitoring Module of the CAV through connection module related to at least one electronic control unit (ECU) of a plurality of electronic control units (ECUs) associated with the CAV. The ECU Update Status Module may also send request to the CAV manufacturer server through a communication interface configured for transmitting a request for requesting security update or security patch for at least one electronic control unit (ECU) of a plurality of electronic control units (ECUs) associated with the CAV. Further, the communication interface may be configured for receiving at least one of a security update and a security patch for the at least one ECU from the CAV manufacturer server based on the transmitting of the request. Further, the Monitoring Module may include a processing device communicatively coupled with the communication interface. Further, the Digital Twin Simulation Module may be configured for generating a complete cybersecurity health report of the CAV based on the determining. Further, the digital twin server may include a storage device communicatively coupled with the processing device. Further, the storage device may be configured for storing the cybersecurity health status report. The Monitoring Module may include one or more processing devices and a memory communicably coupled to the one or more digital display, wherein the digital display is coupled with processing device, wherein the digital device configured for display the at least one prompt and the at least one alert; and a printing device mounted on computing device, wherein the printing device is coupled with processing device, wherein the printing device configured for printing at least one cybersecurity health status report, and a storage device communicatively coupled with processing device, wherein the storage device is configured for storing the cybersecurity health status report.

In some embodiments disclosed herein is a diagnostics system inside digital twin system for facilitating modeling and analyzing for cybersecurity threats associated with a connected autonomous vehicle (CAV) or a specific CAV within the fleet. The diagnostics system may include one or more processing devices and a memory communicably coupled to the one or more processors. The memory stores a connection module of the CAV include instructions that when executed by the one or more processing devices cause the one or more processing devices to, in response to detecting establishment of a connection between a CAV and a Digital Twin Simulation Module, determine attributes of the connection with the digital twin server that indicate at least a relationship between a CAV and the Digital Twin Simulation Module. Further, the diagnostics system may include a storage device communicatively coupled with the processing device. Further, the storage device may be configured for storing the security simulated status at least one electronic control unit (ECU) of a plurality of electronic control units (ECUs) associated with the CAV or specific CAV within the fleet. The memory store the simulated data recorded by at least one electronic control unit (ECU) of a plurality of electronic control units (ECUs) and describing its condition in case of any cyber-attack as it exists in a real-world a status of the at least one electronic control unit (ECU) of a plurality of electronic control units (ECUs) when operated in the real-world; and a processor that is communicatively coupled to the non-volatile memory, where the non-volatile memory stores instructions which, when executed by the processor, causes the processor to simulate a digital twin of the at least one electronic control unit (ECU) of a plurality of electronic control units (ECUs), and update the digital twin of the CAV based on the digital data so that the digital twin is consistent with the current cybersecurity status.

In some embodiments, the Insurance Premium Adjustment Module will dynamically adjust the insurance premium for Connected Autonomous Vehicles (CAVs) based on their real-time cybersecurity risk profile. By integrating the CAV Cybersecurity Risk Score (CAV-CRS), predictive cybersecurity indicators (PCI), and simulation results from the Digital Twin Simulation Module, this module calculates a premium that accurately reflects the vehicle's cybersecurity posture. The Insurance Premium Adjustment Module will calculate and adjust the insurance premium in real-time, based on the security health of the CAV.

In some embodiments, the Insurance Premium Adjustment Module uses a multi-factor equation that incorporates the CAV-CRS, various risk factors, and predictive cybersecurity indicators to determine the final insurance premium. The premium must account for a wide range of factors, including the vehicle's inherent value, its operational environment, usage patterns, and, importantly, its cybersecurity posture. The cybersecurity status of a CAV is particularly significant, as vulnerabilities in software, firmware, or hardware can substantially increase the risk of a cybersecurity breach, which could lead to unsafe driving conditions or unauthorized access to vehicle control systems. The insurance premium equation for CAVs integrates several key components, each contributing to a comprehensive risk assessment.

In some embodiments, the Insurance Premium Adjustment Module integrates data from the Digital Twin Simulation Module and CAV Cybersecurity Risk Score (CAV-CRS) Computation Module to account for real-time and predictive cybersecurity risks. By simulating various attack vectors, the system can predict how specific vulnerabilities will affect the vehicle, and the premium is adjusted accordingly. The insurance premium increases to reflect the immediate risk posed by the vulnerable ECU. The Insurance Premium Adjustment Module calculates a lower premium, reflecting the reduced risk associated with an up-to-date system.

In some embodiments, the Insurance Premium Adjustment Module uses advanced machine learning algorithms to continuously refine its premium calculation models. By analyzing historical data, current threats, and future predictions, the module can dynamically adjust the weights in the premium equation, ensuring that the premium always reflects the most accurate risk profile. The module also allows insurers to fine-tune their risk models based on geographic, demographic, and behavioral factors, providing a more personalized premium for each CAV owner.

Described herein are embodiments of a digital twin system which monitors the connected and autonomous vehicles (CAVs) or specific CAV within the fleet of a single manufacturer of vehicles.

Referring to FIGS. 1-9, Embodiment 1 of the present invention represents a system and method for monitoring and evaluating cybersecurity risk in connected and autonomous vehicles.

Referring to FIG. 1, a system 100 consistent with various embodiments of the present invention is shown. System 100 comprises a network 110, a cybersecurity risk monitoring server (CSRMS) 120, a CAV manufacturer server (CMS) 140, a third-party original equipment manufacturer (OEM)

and Vendor Server (OVS) 150, a connected and autonomous vehicle (CAV) 160, an insurance server (IS) 180, and a computing device (CD) 190. The network 110 communicatively connects the CSRMS 120, the CMS 140, the OVS 150, the CAV 160, the IS 180, and the CD 190. The CSRMS 120 comprises a storage device 121, one or more processing devices 122, a communication interface 123, display devices 124, a user interface 125, a digital twin interface 126, an ECU update status module 127, a CAV-CRS computation module 128, and a digital twin simulation module 129. The digital twin simulation module 129 comprises one or more ECU digital twins 130 and a digital simulations engine 131. The digital twin simulations engine 131 comprises a predictive cybersecurity indicators (PCI) tool 132, a cybersecurity health monitoring tool 133, vehicle cybersecurity health predictions 134, a vehicle cybersecurity health report 135, and a vehicle cybersecurity risk analysis report 136.

The Digital Twin Simulation Module 129 is responsible for generating a virtual replica, or "digital twin," of the vehicle. This twin serves as a dynamic and real-time representation of the CAV, reflecting the current state of all its subsystems, including the Electronic Control Units (ECUs), firmware, software versions, and operational data. The module utilizes this digital twin to run cybersecurity simulations and predict future vulnerabilities, enabling preventive measures to be taken before real-world issues arise. It integrates the CAV Cybersecurity Risk Score (CAV-CRS) Computation Module 128, data from the Monitoring Module, and ECU Update Status Module 127 to provide an accurate representation of the CAV's current and future cybersecurity health. The Digital Twin Simulation Module 129 will simulate the real-time status of the CAV 160 based on current data and predict future risks. It achieves this by using the CAV-CRS and calculates the predictive cybersecurity indicators (PCI) to model potential threats and vulnerabilities that could affect the vehicle.

The CAV Manufacturer Server (CMS) 140 comprises a storage device 141, one or more processing devices 142, a communication interface 143, and software and firmware security update services 144. The third party OEM and vendor server (OVS) 150 comprises a storage device 151, one or more processing devices 152, a communication interface 153, and software and firmware security update services 154.

The connected and autonomous vehicle (CAV) 160 is a vehicle that is capable of operating autonomously. The CAV 160 connects to a network to perform a variety of functions. For example, the CAV 160 may be a passenger car, SUV, or other vehicle. The CAV 160 comprises a storage device 161, one or more processing devices 162, a communication interface 163, a monitoring system 164, one or more vehicle sensors 165, one or more input/output systems 166, and infotainment ECU 167, a navigation control unit ECU 168, a tire pressure monitoring ECU 169, a brake control unit ECU 170, an engine control unit ECU 171, a transmission control unit ECU 172, a ventilation control unit ECU 173, and a CAN/V-ethernet 174.

The insurance server (IS) 180 comprises a storage device 181, one or more processing devices 182, a communication interface 183, a digital twin interface 184, a user interface 185, an insurance premium adjustment module 186, and a digital display 187. The Insurance Premium Adjustment Module 186 will dynamically adjust the insurance premium for Connected Autonomous Vehicles (CAVs) based on their real-time cybersecurity risk profile. By integrating the CAV Cybersecurity Risk Score (CAV-CRS), predictive cybersecurity indicators (PCI), and simulation results from the Digital Twin Simulation Module, this module calculates a premium that accurately reflects the vehicle's cybersecurity posture. The Insurance Premium Adjustment Module will calculate and adjust the insurance premium in real-time, based on the security health of the CAV. Traditional insurance models use static data (such as a vehicle's age, make, model, and driver history) to set premiums. However, with CAVs, the cybersecurity risk is dynamic, influenced by factors such as software updates, firmware patches, and evolving cybersecurity threats. This module allows for a more accurate, risk-based premium, providing flexibility for vehicle owners and enhancing the insurer's ability to manage risk effectively. This ensures that both the vehicle owner and the insurer can make informed decisions based on the actual security state of the vehicle, rather than relying on static, outdated risk assessments.

The Insurance Premium Adjustment Module 186 uses a multi-factor equation that incorporates the CAV-CRS, various risk factors, and predictive cybersecurity indicators to determine the final insurance premium. The premium must account for a wide range of factors, including the vehicle's inherent value, its operational environment, usage patterns, and, importantly, its cybersecurity posture. The cybersecurity status of a CAV is particularly significant, as vulnerabilities in software, firmware, or hardware can substantially increase the risk of a cybersecurity breach, which could lead to unsafe driving conditions or unauthorized access to vehicle control systems. The insurance premium equation for CAVs integrates several key components, each contributing to a comprehensive risk assessment. The Base Premium ($P_{base}$) is the foundational cost of insuring the CAV, calculated based on the vehicle's inherent value, the general risk associated with its type, and typical accident rates. This base premium serves as the starting point for the premium calculation. The CAV Cybersecurity Risk Score (CAV-CRS) is a dynamic score representing the cybersecurity risk of the vehicle. This score is recalculated periodically based on updates, identified vulnerabilities, and the overall cybersecurity posture of the vehicle. The CAV-CRS directly influences the insurance premium, reflecting the vehicle's susceptibility to cyber threats. The equation also includes several risk factors that adjust the premium based on specific operational and environmental considerations. The Driving Behavior Risk Factor ($R_{driving}$) accounts for the CAV's autonomous driving performance, incorporating metrics such as historical driving behavior, compliance with traffic laws, and the effectiveness of the vehicle's decision-making algorithms. The Geographical Risk Factor ($R_{geo}$) adjusts the premium according to the vehicle's primary operating area, with different risk levels associated with urban versus rural environments or high-crime areas. The Usage Risk Factor ($R_{usage}$) reflects the vehicle's usage type, distinguishing between commercial and personal use, as these carry different levels of risk. Similarly, the Environmental Risk Factor ($R_{env}$) adjusts the premium based on environmental conditions that might affect the vehicle's operation, such as weather patterns or road quality. A critical component of the equation is the Dynamic Adjustment Factor ($D_{adjust}$), which accounts for real-time changes in the vehicle's cybersecurity status. This factor ensures that the insurance premium remains accurate over time, reflecting any updates, patch management activities, or changes in the vehicle's vulnerability status. Finally, the Predictive Cybersecurity Indicator Adjustment ($P_{predict}$) represents adjustments to the premium after addressing the Predictive Cybersecurity Indicators. When updates are installed to address identified software, firmware, or hardware vulnerabilities, the cybersecurity risk is reduced, and this reduction is factored into the insurance premium calculation. This adjustment ensures that the premium fairly reflects the decreased risk after mitigating cybersecurity threats. To encapsulate all these factors, the comprehensive insurance premium equation for CAVs is expressed as follows:

$$\text{Premium} = P_{base} \times (1 + f(CAV - CRS)) \times$$
$$R_{driving} \times R_{geo} \times R_{usage} \times R_{env} \times D_{adjust} \times (1 - P_{predict})$$

The Insurance Premium Adjustment Module 186 integrates data from the Digital Twin Simulation Module 129 and the CAV Cybersecurity Risk Score (CAV-CRS) Computation Module 128 to account for real-time and predictive cybersecurity risks. By simulating various attack vectors, the system can predict how specific vulnerabilities will affect the vehicle, and the premium is adjusted accordingly. For example, The Digital Twin Simulation Module 129 identifies a critical vulnerability in the vehicle's braking ECU 170, and the CAV-CRS score is high due to the outdated software. The insurance premium increases to reflect the immediate risk posed by the vulnerable ECU. The Insurance Premium Adjustment Module 186 recommends that the vehicle owner apply the necessary update to lower the premium. After applying the patch and receiving confirmation from the ECU Update Status Module 127, the premium is adjusted downward, reflecting the reduced risk. Similarly, in another scenario, based on Predictive Cybersecurity Indicators received from the Digital Twin Simulation Module 129 suggest a high likelihood of a network-based attack on the vehicle's GPS system in the next three months, based on historical data and current trends. The module increases the premium for this period to reflect the potential risk. The system notifies the vehicle owner about the increased threat and suggests implementing enhanced network security measures. Once the risk subsides (either due to mitigation actions or updated simulations), the premium is adjusted back to normal levels. Moreover, in another scenario, if the vehicle owner regularly applies software and firmware updates to all ECUs. The CAV-CRS score remains low, and no significant risks are identified in the Predictive Cybersecurity Indicators. The Insurance Premium Adjustment Module 186 calculates a lower premium, reflecting the reduced risk associated with an up-to-date system. The vehicle owner benefits from staying current on security updates. Once the premium is calculated, the Insurance Premium Adjustment Module 186 provides real-time feedback to the vehicle owner, allowing them to understand the factors influencing their premium and take action if needed. For instance, if the premium increases due to a vulnerability, the module will recommend applying an update to reduce the risk and bring the premium down. This dynamic feedback loop encourages proactive cybersecurity management and helps both vehicle owners and insurers better manage risk. The Insurance Premium Adjustment Module 186 uses advanced machine learning algorithms to continuously refine its premium calculation models. By analyzing historical data, current threats, and future predictions, the module can dynamically adjust the weights in the premium equation, ensuring that the premium always reflects the most accurate risk profile. The module also allows insurers to fine-tune their risk models based on geographic, demographic, and behavioral factors, providing a more personalized premium for each CAV owner.

The computing device (CD) 190 comprises a storage device 191, one or more processing devices 192, a communication interface 193, a digital twin interface 194, a user interface 195, an insurance premium module interface 196, a digital display 197, and a policy management interface 198.

Figure 2:
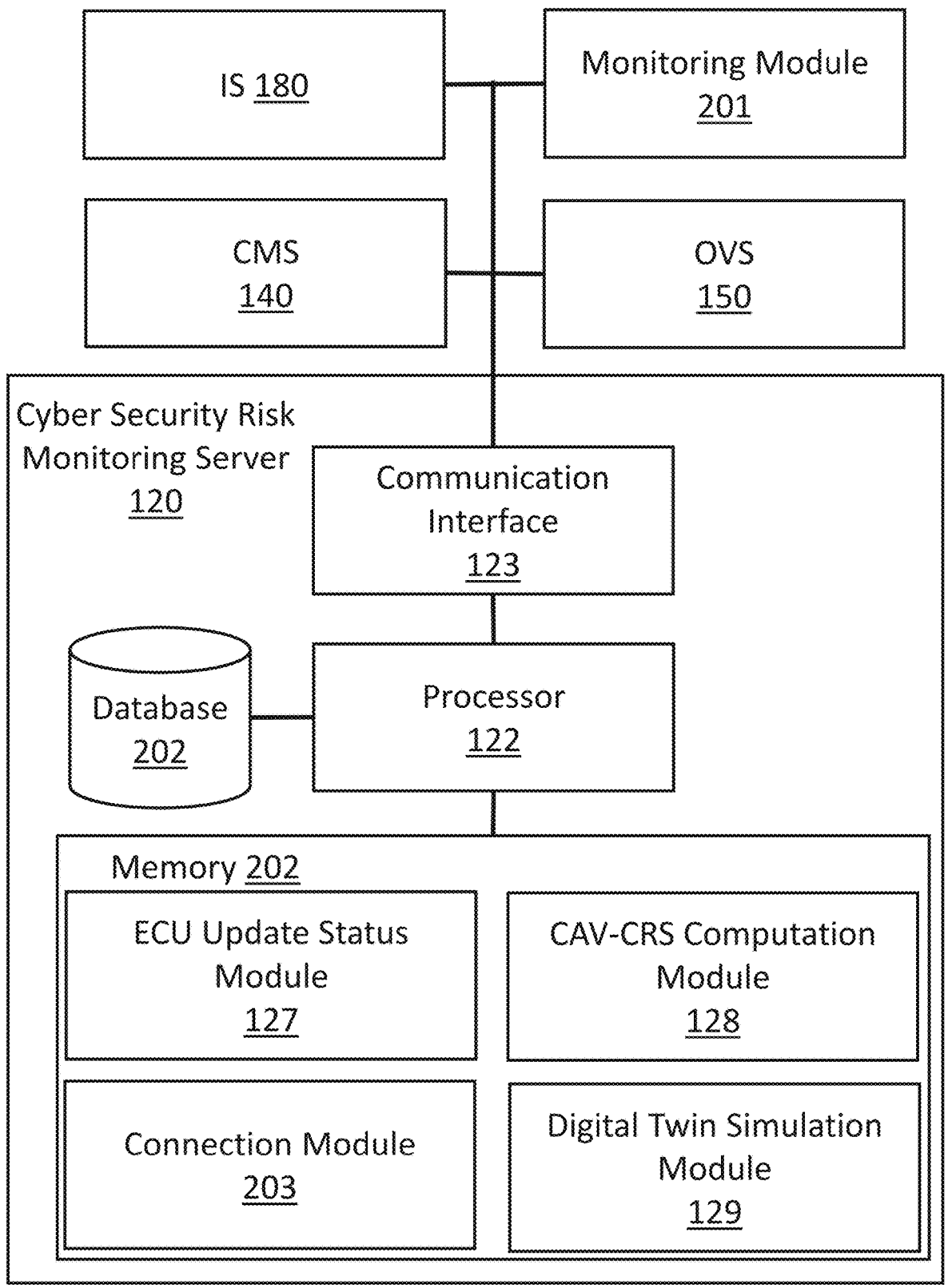
FIG. 2 is a block diagram of a system for monitoring and evaluating cybersecurity risk related to a CAV.

Referring to FIG. 2, a system consistent with various embodiment of the present invention is shown. The system comprises the IS 180, a monitoring module 201, the CMS 140, the OVS 150, and the CSRMS 120. The CSRMS comprises the communication interface 123, a database 202, the processor 122, memory 202, the ECU update status module 127, the CAV-CRS computation module 128, a connection module 203, and the digital twin simulation module 129.

Figure 3:
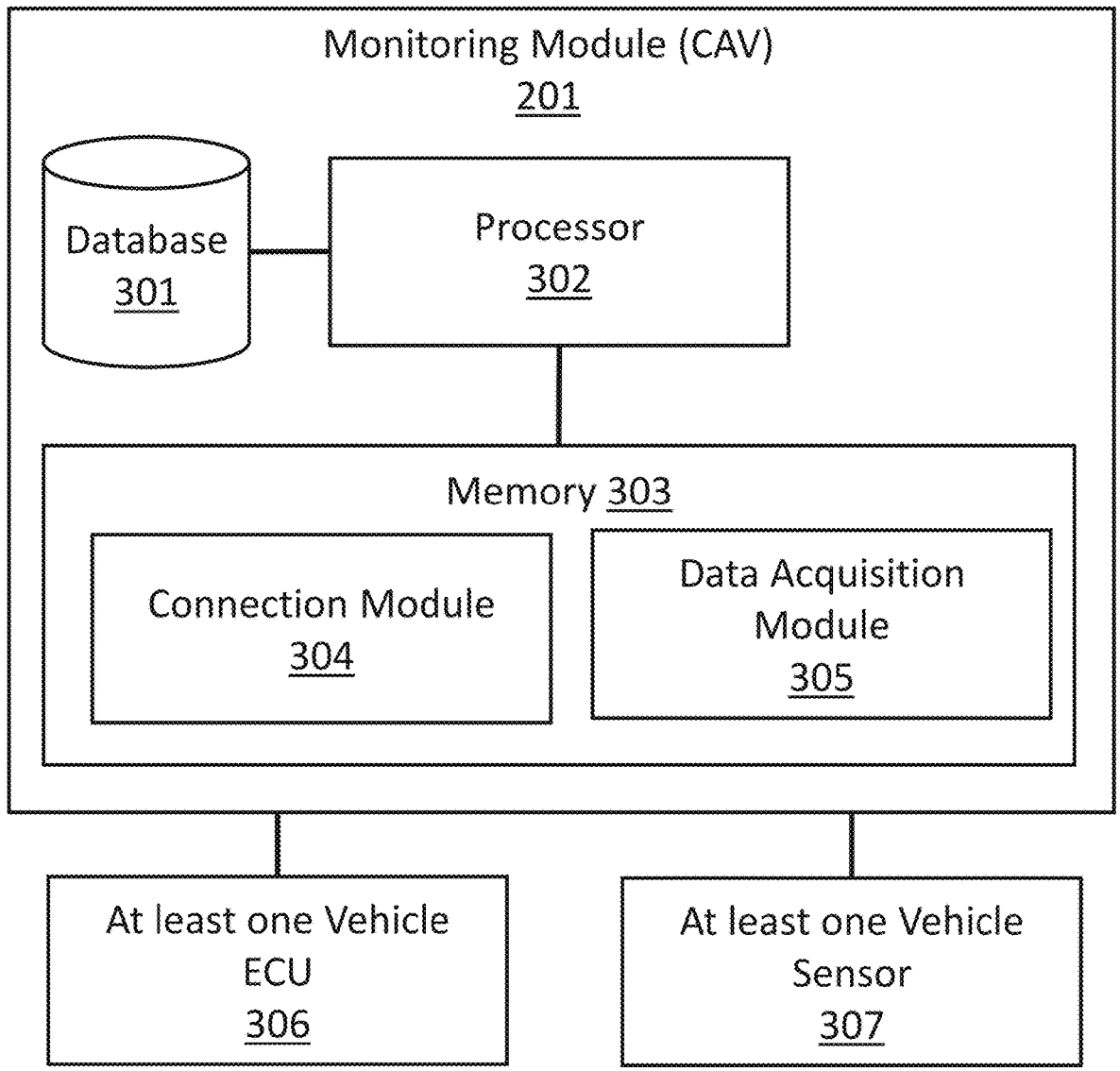
FIG. 3 is a block diagram of a system for monitoring and evaluating cybersecurity risk related to a CAV.

Referring to FIG. 3, a monitoring module 201 consistent with various embodiments of the present invention is shown. The monitoring module 201 is located onboard the CAV 160. The monitoring module 201 comprises a database 301, a processor 302, memory 303, a connection module 304, a data acquisition module 305, at least one vehicle ECU 306, and at least one vehicle sensor 307. The monitoring module 201 is responsible for continuously monitoring, collecting, and transmitting various streams of data that are essential for evaluating the vehicle's operational state and cybersecurity health. This data is gathered from different sources within the vehicle, including Electronic Control Units (ECUs), environmental sensors, vehicle dynamics systems, and user-generated inputs. Data Collection from ECUs is a main function of the Monitoring Module. The CAV contains multiple ECUs, each responsible for managing specific vehicle functions, such as engine control, braking systems, infotainment, and security protocols. The Monitoring Module regularly queries these ECUs to extract critical data points, such as the current software version, firmware version, and applied patches. This information is gathered through standard automotive communication protocols like CAN (Controller Area Network), LIN (Local Interconnect Network), and more advanced protocols such as Ethernet AVB (Audio Video Bridging). This data is then sent to the ECU Update Status Module, where the need for updates or patches is assessed based on external inputs from manufacturers or vendors. In addition to ECU data, the Monitoring Module collects Vehicle Operational Data. This includes metrics such as speed, acceleration, brake system status, and steering system performance. These parameters are essential for understanding how the vehicle operates under different conditions and can also provide insights into potential cybersecurity vulnerabilities. This operational data is collected using vehicle systems like OBD-II (On-Board Diagnostics) interfaces, which interact with the ECUs responsible for controlling the vehicle's dynamics. The Monitoring Module gathers real-time environmental information through sensors embedded in the CAV. This data includes weather conditions (e.g., rain, fog, snow), road conditions (e.g., wet or icy roads, construction zones), and traffic conditions (e.g., vehicle congestion, nearby obstacles). The data is collected from advanced sensors such as LiDAR, Radar, Ultrasonic Sensors, and Cameras, which ensure that the vehicle remains aware of its surroundings and can adapt to changing conditions. User-Generated Data is referring to any inputs or actions generated by the owner or passengers that may affect the CAV's cybersecurity posture. It includes information such as usage logs of infotainment systems, mobile devices connected to the CAV's network, and user preferences or settings like driving modes or seat adjustments. The Monitoring Module also tracks the CAV's Location Data using the vehicle's GPS system. Location data provides the geographic coordinates (latitude, longitude, altitude) of the CAV, which is critical for performing geo-specific risk assessments. For instance, certain geographic regions may have higher cybersecurity risks due to local infrastructure or environmental challenges. Additionally, the location data is essential for simulating realistic operational environments and determining how the CAV's security systems perform in different contexts.

The data collected by the Monitoring Module is transmitted to the ECU Update Status Module and the Digital Twin Simulation Module. Communication technologies like V2X (Vehicle-to-Everything) ensure real-time or near real-time transmission of data between the CAV and external systems, while 5G connectivity is used when the data needs to be transmitted to cloud-based systems. Within the vehicle, intra-vehicle networks like Controller Area Network (CAN), Local Interconnect Network (LIN), Media Oriented System Transport (MOST), FlexRay and Ethernet handle the communication between different components. The data flow within the Monitoring Module can be represented as follows: Let E={ECU1, ECU2, ..., ECUn} be the set of ECUs in the CAV, where each ECU stores software version Si, firmware version Fi, and patch status Pi. The total ECU data collected is the sum of all individual ECU data: Similarly, the vehicle dynamics data is represented as Dvehicle={Speed, Acceleration, Brake Status, Steering Status, ...}, environmental data as Denvironment={Weather, Road Condition, Traffic Condition ...}, user-generated data as Duser={Infotainment Usage, Device Connections, User Preferences, ...}, and location data as LCAV={Latitude, Longitude, Altitude}. The collected data is then aggregated into a comprehensive dataset:

Dcollected={ECUdata, Dvehicle, Denvironment, Duser, LCAV}

This dataset is transmitted to the relevant modules, allowing the system to assess the current state of the CAV, simulate future scenarios, and calculate cybersecurity risks.

The ECU Update Status Module primary function is to evaluate the status of all ECUs, ensuring that their software, firmware, and security patches are up to date. This module analaze real-time data received from the Monitoring Module and comparing it with the latest versions available for software, firmware, or hardware component from manufacturers, vendors, or third-party providers and it also access the End of Service (EOS), End of Life (EOL) of software, firmware, or hardware components of the CAV. If any ECU is identified as outdated or in need of a patch, the ECU Update Status Module triggers an update alert.

The ECU Update Status Module receive data from the Monitoring Module. This data includes the current software version, firmware version, and patch status of each ECU in the CAV. Using this information, the ECU Update Status Module performs a comparison against the latest available versions, End of Service (EOS), End of Life (EOL), security vulnerability comparison, and timestamp comparison from external sources. These external sources include manufacturer databases, third-party service providers, and public vulnerability databases, such as the National Vulnerability Database (NVD). The comparison determines whether any discrepancies exist, such as outdated software or missing patches, which would necessitate an update.

The ECU Update Status Module transmits the updated state of each ECU to Digital Twin Simulation Module and the CAV Cybersecurity Risk Score (CAV-CRS) Computation Module. The Digital Twin Simulation Module relies on this updated data to create realistic models of the vehicle and simulate various scenarios, while the CAV-CRS Computation Module uses the updated ECU data to calculate a new cybersecurity risk score. ECUs that remain outdated or vulnerable would increase the vehicle's risk score, which could have a direct impact on insurance premium calculations. The ECU Update Status Module manages several important parameters. The software version refers to the current control software running on the ECU, which is regularly updated to introduce new features or improve cybersecurity. The firmware version is the low-level code controlling the hardware components of the ECU, which also requires occasional updates to address vulnerabilities or improve functionality. Lastly, the patch status indicates whether all necessary security patches have been applied. Missing patches represent a significant cybersecurity risk, and the ECU Update Status Module ensures these are applied as quickly as possible. The ECU Update Status Module will also check for any downgrading ECU firmware installations to a vulnerable version after a security update has been applied.

The update status Ui of each ECU is influenced by various factors, including version comparison, patch status, EOS, EOL, security vulnerability comparison, and timestamp comparison. Where: VCi represents the Version Comparison for the ECU. PSi represents the Patch Status. EOSi captures the End of Service status. EOLi captures the End-of-Life status. VULi represents the Security Vulnerability comparison. TSi represents the Timestamp comparison. The VCi (Software and Firmware Version Comparison) is calculated by comparing the current software/firmware versions against previous versions to check for updates using following equation:

$$VC_i = \frac{V_{new}^i}{V_{old}^i} \quad (1)$$

where VCi>1 represents the condition under which an update has been done on the software or firmware. The PSi (Patch Status Comparison) is calculated by checking whether the latest patches have been applied to the software/firmware using following equation:

$$PS_i = \begin{cases} 1 & \text{if latest patches are applied} \\ 0 & \text{else} \end{cases} \quad (2)$$

The EOSi (End of Service (EOS)) and EOLi End of Life (EOL) Status is determined through checking to see if the software/firmware/hardware has a remaining service life or is close to being out of service. Let Trs, Trl represents remaining time until End of Service and End of Life (e.g., in months or days) and Tts, Ttl denotes total service support period from the release date to the End of Service and End of Life date, respectively.

$$EOS_i = \frac{T_{rs}^i}{T_{ts}^i} \quad (3)$$

If EOSi is closer to 1 indicates that the software/firmware/hardware is fully within its service period and EOSi=0 means that the service period has ended.

$$EOL_i = \frac{T_{rl}^i}{T_{tl}^i} \quad (4)$$

If 0<EOLi<1, then it means that the component is still supported and EOLi=0 if it has reached EOL. The VULi (Security Vulnerability Comparison) compares the reduction in vulnerabilities between the current and previous states.

$$VUL_i = \frac{Vul_{old}^i - Vul_{new}^i}{Vul_{new}^i} \quad (5)$$

If VULi>0 then it indicates a reduction in vulnerabilities, suggesting an update. The TSi (Timestamp Comparison) ensures that the update is the most recent.

$$TS_i = \frac{TS_t^i}{TS_{t-1}^i} \quad (6)$$

where TSi>1 confirms latest update. The overall update status Ui can be expressed as:

$$U_i = \alpha \times VC_i + \beta \times PS_i + \gamma \times EOS_i + \delta \times EOL_i + \epsilon \times VUL_i + \zeta \times TS_i \quad (7)$$

The coefficients $\alpha$, $\beta$, $\gamma$, $\delta$, $\epsilon$, $\zeta$ are weights assigned to each factor based on their importance, and they satisfy the condition: $\alpha+\beta+\gamma+\delta+\epsilon+\zeta=1$ The Connected and Autonomous Vehicle Cybersecurity Risk Score (CAV-CRS) is a comprehensive metric designed to evaluate the cybersecurity risk associated with the various Electronic Control Units (ECUs) within a connected or autonomous vehicle. The CAV-CRS considers multiple critical factors, including the update status, the criticality, sensitivity, likelihood of attack, risk weighting and the impact of each ECU on overall vehicle operation. This holistic approach ensures that the cybersecurity posture of a vehicle is accurately represented, enabling better risk management and mitigation strategies. Each component is carefully weighted and contributes to a final score that guides stakeholders in evaluating and addressing potential cybersecurity vulnerabilities within the vehicle's ECUs. Below is a detailed explanation of the CAV-CRS, along with its main equation and corresponding sub-equations. The CAV-CRS is defined as:

$$CAV - CRS = \sum_{i=1}^{n} \left( \frac{W_i \times S_i \times I_i \times L_i}{U_i} \right) \quad (8)$$

Where n is the total ECUs within the vehicle, Wi is in fact the Weighting Risk with respect to ECUi and Si is the Sensitivity of ECUi to cybersecurity threats. Ii is the Impact of ECUi on the overall vehicle operation. Li is the Likelihood of a cybersecurity event affecting ECUi. Whereas, Ui is the Update Status of ECUi, with higher values indicating more up-to-date and secure systems. The following text explains these factors in detail.

Weighting Risk (Wi) factor represents the relative importance or risk weight assigned to each ECU based on its function within the vehicle.

$$W_i = \frac{C_i}{\sum_{i=1}^{n} C_i} \quad (8a)$$

Where Ci is a coefficient that represents the level of impact of ECUi on the core functional of a CAV. The range of Wi is between 0 and 1. On the other hand, Sensitivity (Si) factor reflects how vulnerable an ECU is to cybersecurity threats, considering aspects such as exposure, data handling, and access points.

$$S_i = \frac{V_i}{\max(V_1, V_2, \ldots V_n)} \quad (8b)$$

Where Vi is the vulnerability score for ECUi, which can be determined based on known vulnerabilities and potential attack vectors. The range of values of Si is between 0 and 1 as well. The impact factor (Ii) measures the potential effect on the vehicle's operation if a specific ECU is compromised.

$$I_i = \frac{D_i \times E_i}{\max(D_1, D_2, \ldots D_n) \times \max(E_1, E_2, \ldots, E_n)} \quad (8c)$$

Where Di is the degree of dependence of the vehicle on ECUi, and Ei is the extent of the operational impact. Likelihood (Li) factor estimates the probability that a particular ECU will be targeted or affected by a cybersecurity event.

$$L_i = \frac{A_i \times T_i}{\max(A_1, A_2, \ldots, A_n) \times \max(T_1, T_2, \ldots, T_n)} \quad (8d)$$

Where Ai is the attractiveness of ECUi as a target, and Ti is the threat level associated with ECUi.

The update status Ui of an ECUi is a composite measure derived from several sub-factors that indicate how up-to-date the ECU is in terms of software, firmware, and hardware updates. A higher Ui indicates a more secure and up-to-date system, which should reduce the overall risk score. The mathematical expression of Ui is given in Equation (7).

Figure 4:
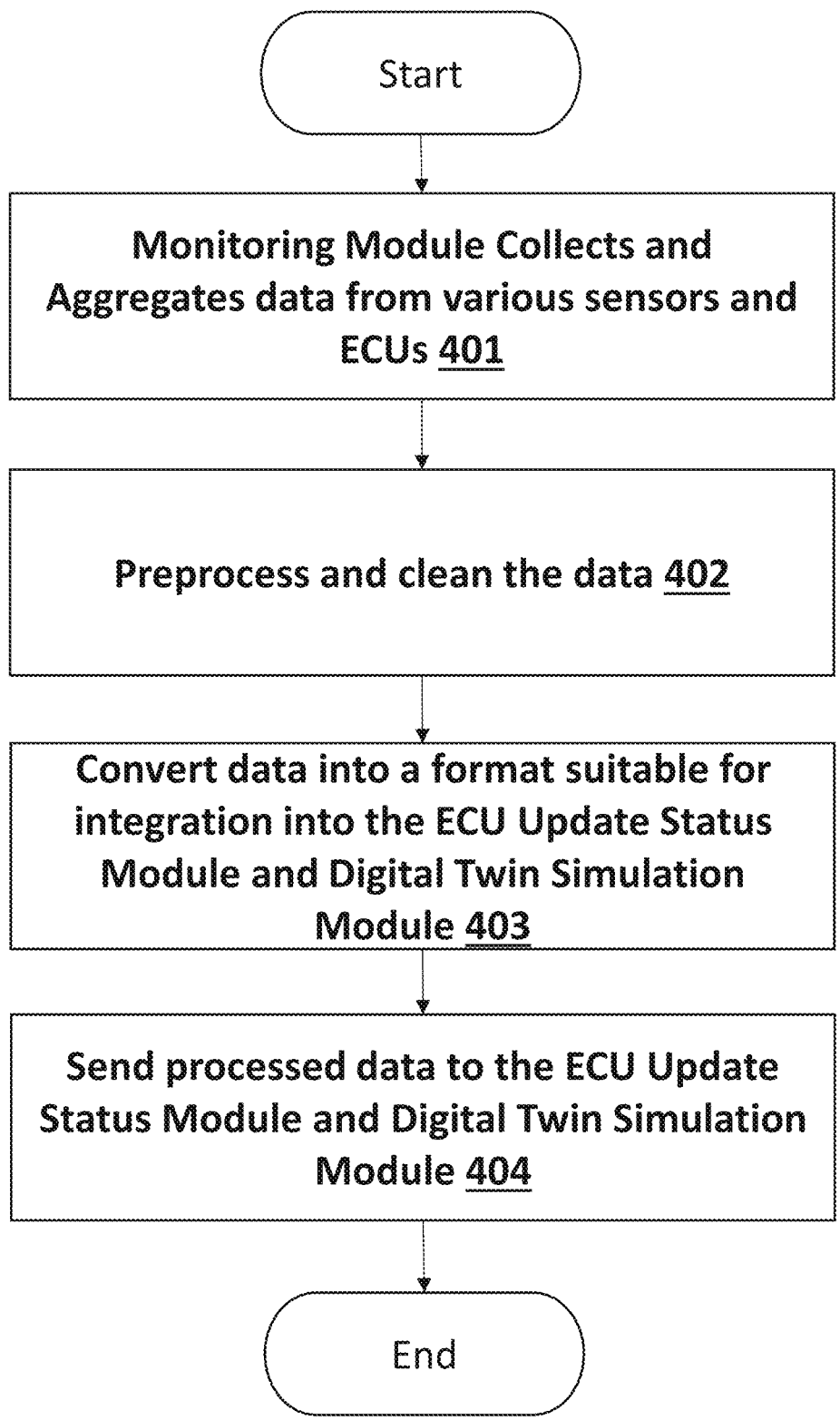
FIG. 4 is a flowchart of a method for monitoring and evaluating cybersecurity risk related to a CAV using Digital Twin, in accordance with some embodiments.

FIG. 4 is a flowchart of a method for monitoring and evaluating cybersecurity risk related to a CAV using Digital Twin, in accordance with some embodiments. At step 401, the monitoring module collects and aggregates data from various sensors and ECUs 167-173. At step 402, the monitoring module preprocesses and cleans the data. At step 403, the monitoring module converts the data into a format suitable for integration into the ECU update status module and into the digital twin simulation module 129. At step 404, the monitoring module sends the processed data to the ECU update status module and to the digital twin simulation module 129.

Figure 5:
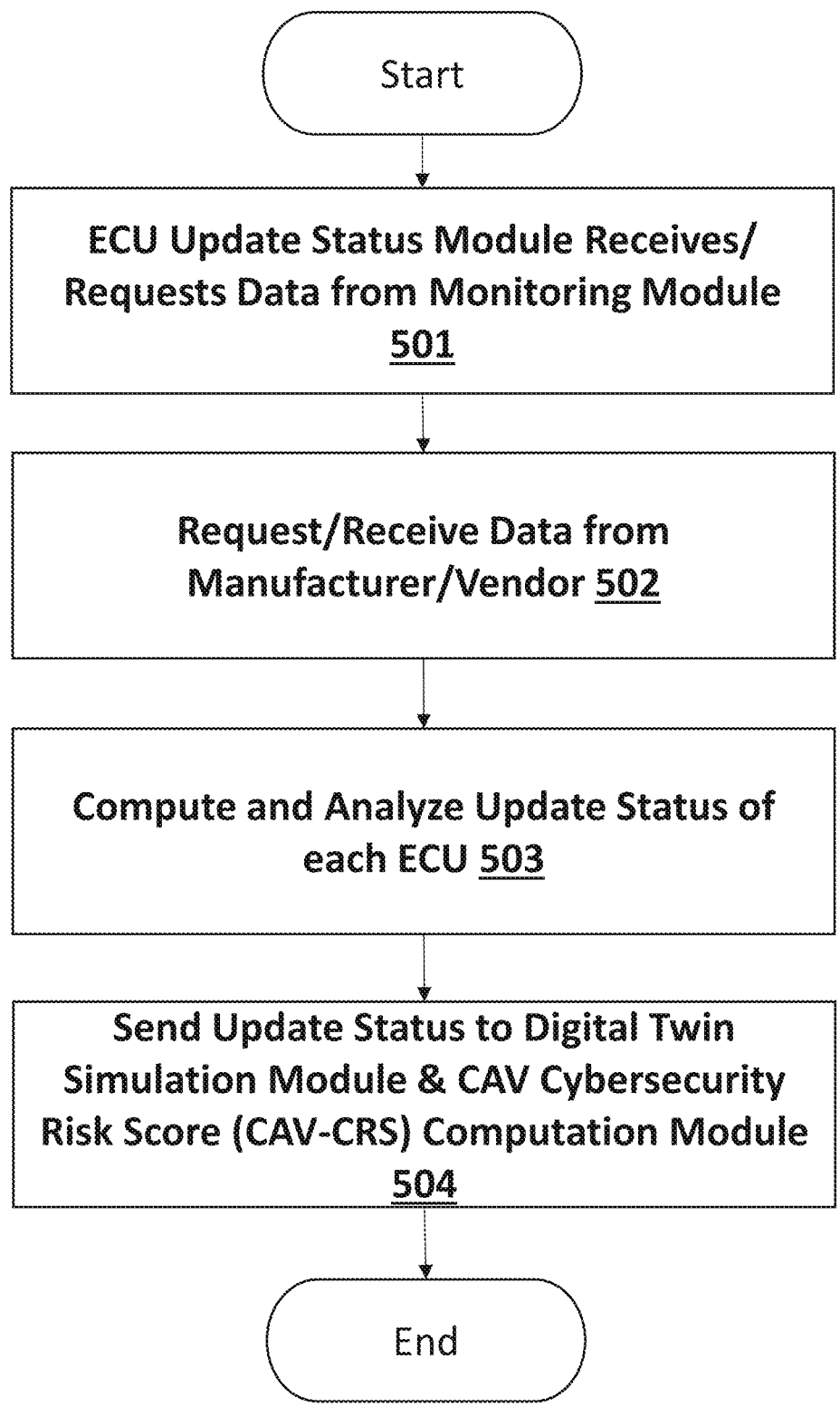
FIG. 5 is a flowchart of a method for monitoring and evaluating cybersecurity risk related to a CAV using Digital Twin, in accordance with some embodiments.

FIG. 5 is a flowchart of a method for monitoring and evaluating cybersecurity risk related to a CAV using Digital Twin, in accordance with some embodiments. At step 501, the ECU update status module 127 requests and receives data from the monitoring module 201. At step 502, the ECU update status module 127 requests and receives data from the manufacturer and/or vendor. At step 503, the ECU update status module 127 computes and analyzes the update status of each ECU 167-173. At step 504, the ECU update status module 127 sends the update statuses to the digital twin simulation module 129 and to the CAV-CRS computation module 128.

Figure 6:
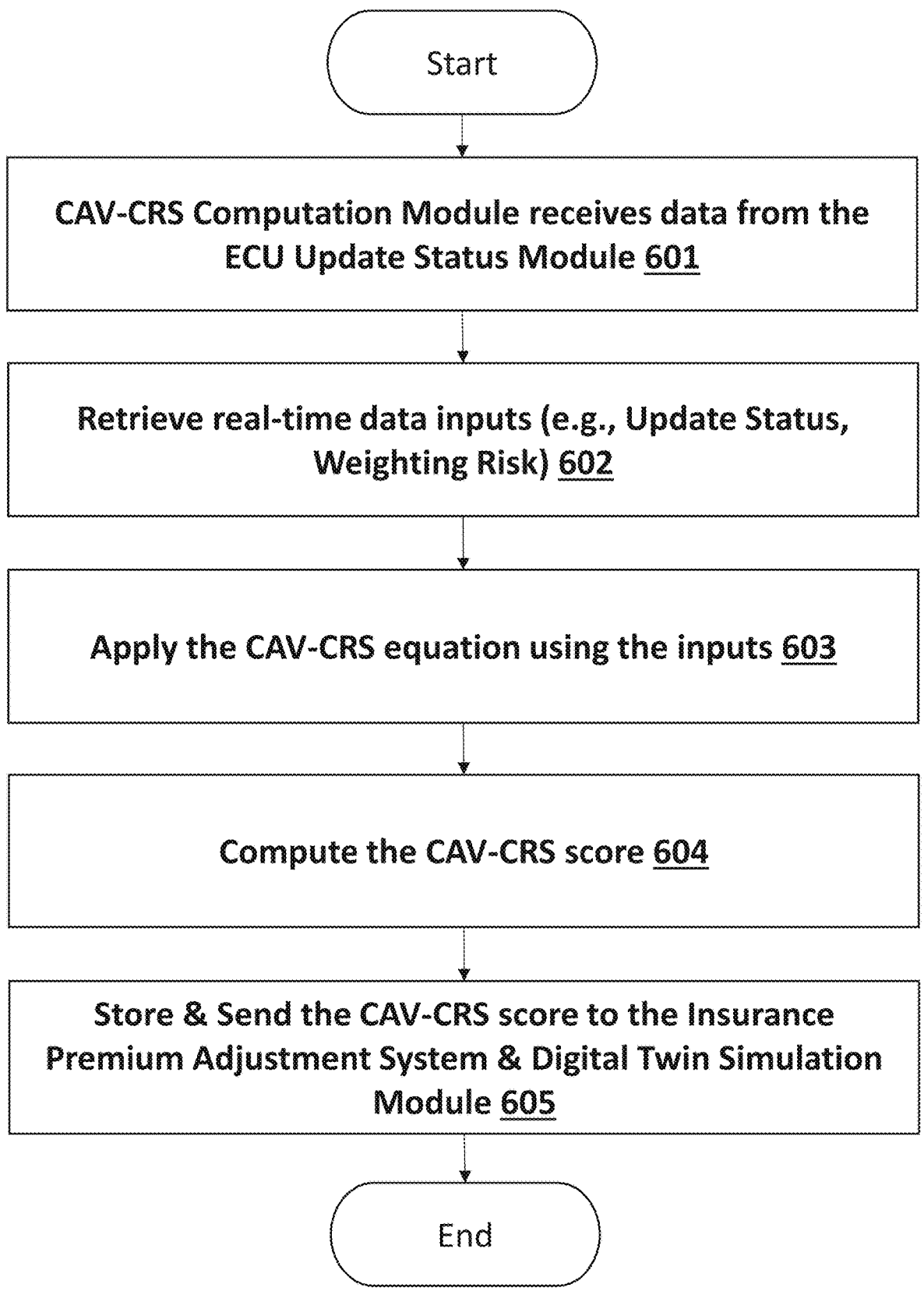
FIG. 6 is a flowchart of a method for monitoring and evaluating cybersecurity risk related to a CAV using Digital Twin, in accordance with some embodiments.

FIG. 6 is a flowchart of a method for monitoring and evaluating cybersecurity risk related to a CAV using Digital Twin, in accordance with some embodiments. At step 601, the CAV-CRS computation module 128 receives data from the ECU update status module 127. At step 602, the CAV-CRS computation module 128 retrieves real-time data inputs, including update statuses and risk weights. At step 603, the CAV-CRS computation module 128 applies the CAV-CRS equation to the inputs. At step 604, the CAV-CRS computation module 128 computes the CAV-CRS score. At step 605, the CAV-CRS computation module 128 stores and sends the CAV-CRS score to the insurance premium adjustment system and to the digital twin simulation module 129.

Figure 7:
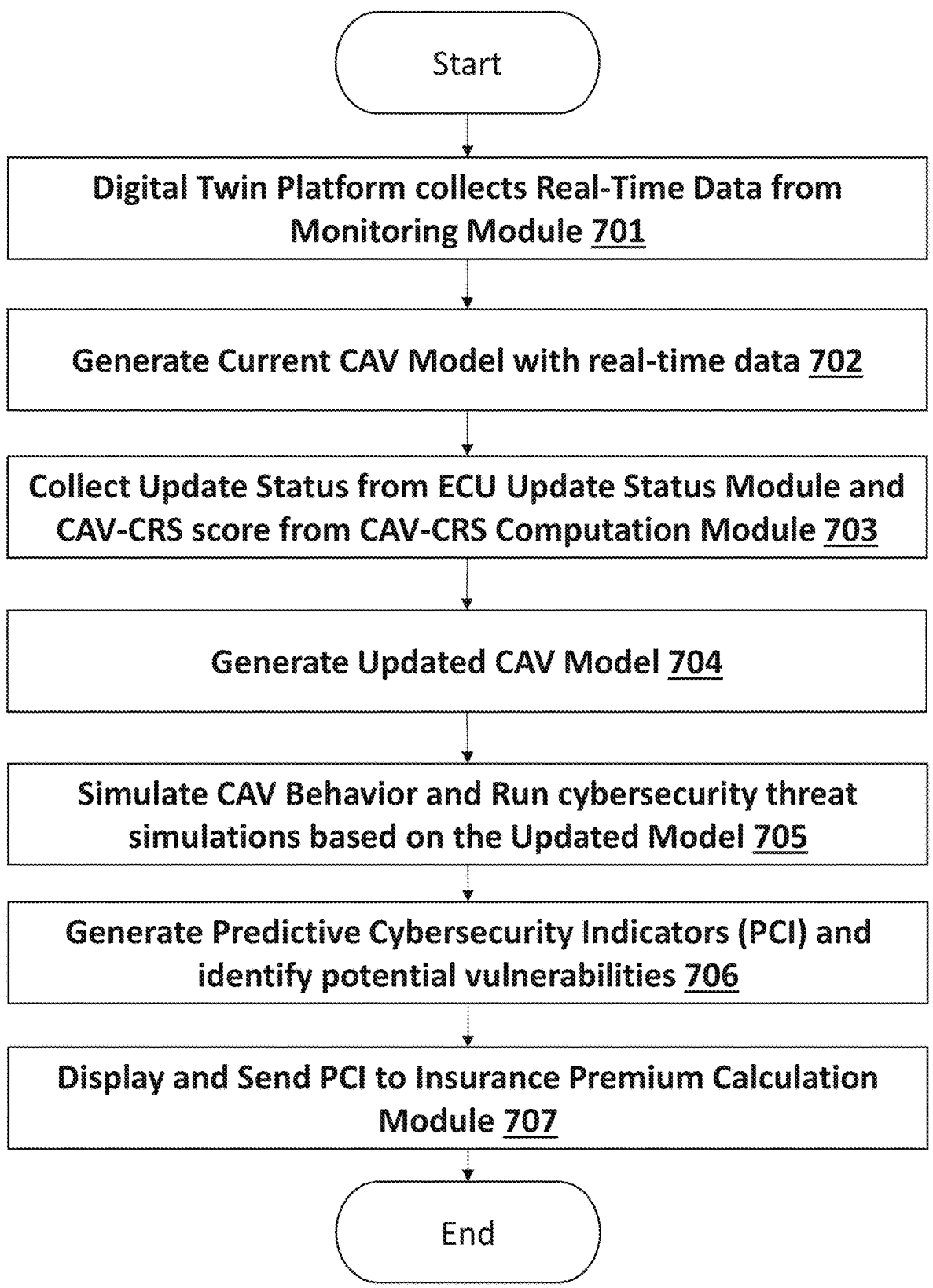
FIG. 7 is a flowchart of a method for monitoring and evaluating cybersecurity risk related to a CAV using Digital Twin, in accordance with some embodiments.

FIG. 7 is a flowchart of a method for monitoring and evaluating cybersecurity risk related to a CAV using Digital Twin, in accordance with some embodiments. At step 701, the digital twin platform collects real-time data from the monitoring module 201. At step 702, the digital twin platform generates a current CAV model, or "digital twin," using the real-time data. The Digital Twin Simulation Module will first generate the Current Model or Real-time Model of the CAV, based on data received from the Monitoring Module, which includes ECU data, vehicle operational data, environmental data, user-generated data, and the current location of the vehicle. At step 703, the digital twin platform collects update statuses from the ECU update status module 127 and the CAV-CRS score from the CAV-CRS computation module 128.

At step 704, the digital twin platform generates an updated CAV model. The Digital Twin Simulation Module will then generate Updated Model, after receiving the CAV's cybersecurity risk score through CAV-CRS Computation Module and updated ECUs status through ECU Update Status Module. The Updated Model will generate the updated version of the CAV that will reflect the potential vulnerabilities or threats after incorporating the CAV-CRS. At step 705, the digital twin platform simulates CAV behavior and runs cybersecurity threat simulations based on the updated model. After receiving the data from Monitoring Module, and ECU Update Status Module, the Digital Twin Simulation Module will simulate various scenarios, predicting how the vehicle will respond to different cybersecurity risks. The module can simulate specific attack vectors, such as unauthorized access to a particular ECU or a network-based denial of service attack. By evaluating how the vehicle's systems perform under different simulated conditions, the module can help identify vulnerabilities before they are exploited in real-world scenarios.

The Digital Twin Simulation Module runs predictive simulations using machine learning and artificial intelligence algorithms. These algorithms analyze historical attack patterns, real-time data, and ECU vulnerabilities to predict future risks. By simulating various "what-if" scenarios, the system can identify potential attack vectors and vulnerabilities long before they occur in real-world settings. This proactive approach enhances the CAV's overall security by anticipating threats and enabling preventive action. For example, Digital Twin Simulation Module receives real-time ECU data indicating that the vehicle's braking system has an outdated firmware version. The digital twin updates the current model to reflect this vulnerability. The CAV-CRS score increases due to the heightened risk associated with the braking system. The Digital Twin Simulation Module simulates an attack where an unauthorized entity gains control of the braking ECU. It evaluates how the vehicle's overall system responds, including whether the driver can regain control and whether the attack impacts other ECUs. The simulation shows a critical vulnerability, and the system flags the ECU for an immediate software update. Similarly, in another scenario, the Digital Twin Simulation Module receives real-time location data showing the vehicle in an area known for location spoofing attacks (e.g., near high-risk infrastructure). The digital twin simulates an attack where the vehicle's GPS is spoofed, causing incorrect location data to be sent to the vehicle's systems. The simulation predicts how the vehicle will respond to this altered location data. For example, the vehicle may attempt to drive into restricted areas or fail to properly navigate. The Digital Twin Simulation Module identifies this as a potential vulnerability, triggering the system to adjust the risk score and recommend mitigation strategies, such as enhanced GPS security measures. Let's consider another scenario, the Digital Twin Simulation Module receives operational data showing signs of irregular engine performance. Combined with the CAV-CRS, this data suggests that a critical ECU might be at risk of malfunction. The digital twin simulates the vehicle's performance over time if the engine ECU is compromised. The simulation predicts potential failures or security breaches that could arise from the compromised ECU. The Digital Twin Simulation Module generates PCI, indicating that the engine ECU is at risk of failure within a specific time frame if not addressed and will recommends proactive maintenance, such as a firmware update or ECU replacement, before the issue manifests in the real vehicle. The Digital Twin Simulation Module is tightly integrated with other key components of the CAV system. It receives real-time data from the Monitoring Module, updates and risk scores from the ECU Update Status Module, and cybersecurity risk indicators from the CAV Cybersecurity Risk Score (CAV-CRS) Computation Module. Once the simulation is complete, the module sends the results such as PCI and updated risk scores back to the Insurance Premium Calculation Module, which adjusts insurance premiums based on the predicted cybersecurity risks.

The Digital Twin Simulation Module will continuously simulate the current and updated states of the vehicle based on real-time data, the module provides invaluable insights into potential vulnerabilities and future risks. The predictive capabilities of the module allow vehicle manufacturers, insurers, and security teams to take a proactive approach to cybersecurity, ensuring the safety and reliability of CAVs on the road and assists in determining necessary security updates. Through integration with other system components, such as the CAV-CRS Computation Module and the Monitoring Module, the Digital Twin Simulation Module enables a comprehensive, real-time defense against emerging cybersecurity threats.

At step 706, the digital twin platform generates predictive cybersecurity indicators (PCI) and identifies potential vulnerabilities. The Digital Twin Simulation Module will generate Predictive Cybersecurity Indicators (PCI) by using predictive algorithms to calculate potential future risks. The PCI are based on simulated attacks and vulnerabilities. These indicators predict future cybersecurity risks and allow the Insurance Premium Calculation Module to proactively adjust premiums. For example, if the PCI indicates a high likelihood of a future attack, the premium will be adjusted upwards to account for this increased risk. At step 707, the digital twin platform displays and sends the PCIs to an insurance premium calculation module.

Figure 8:
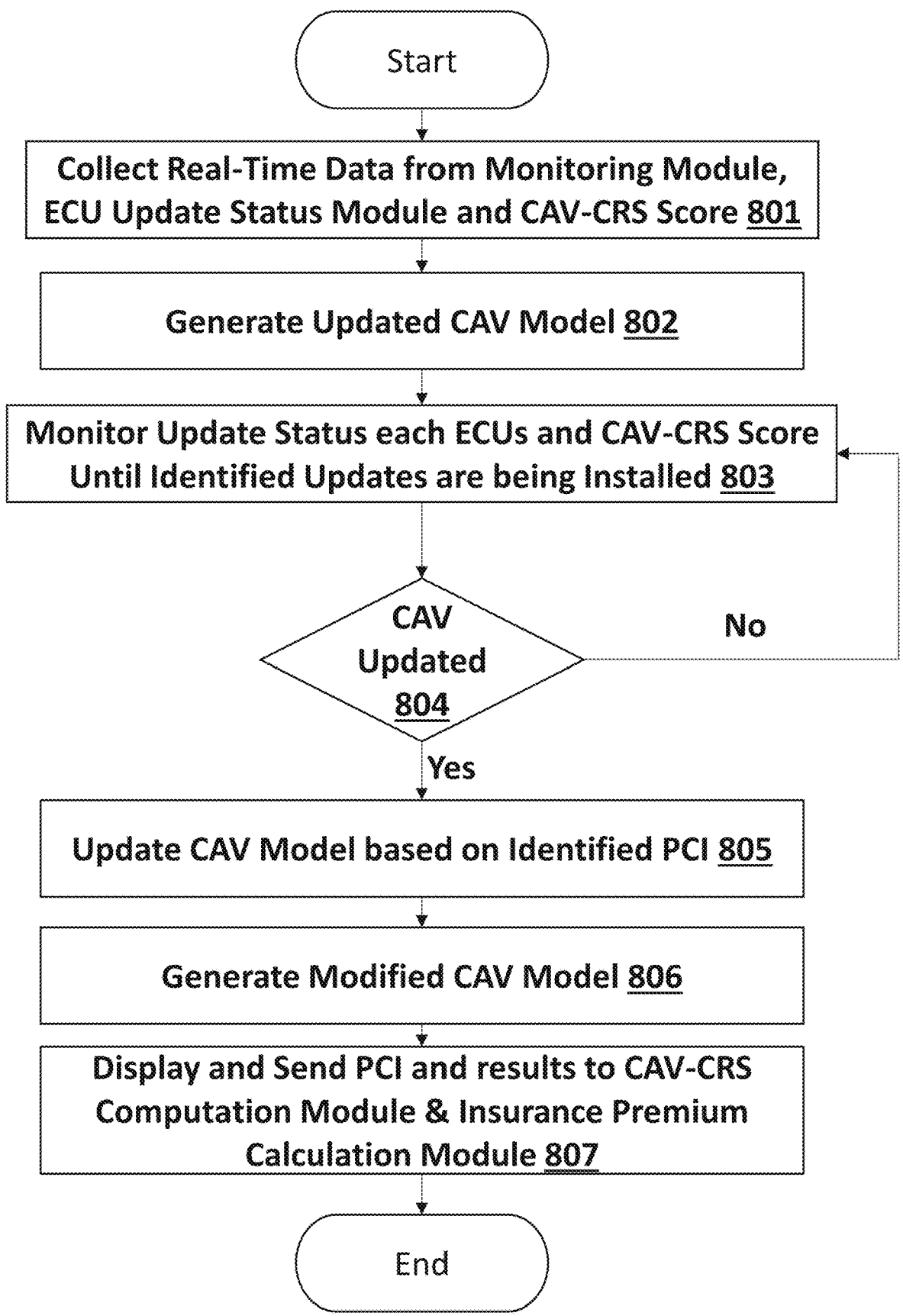
FIG. 8 is a flowchart of a method for monitoring and evaluating cybersecurity risk related to a CAV using Digital Twin, in accordance with some embodiments.

FIG. 8 is a flowchart of a method for monitoring and evaluating cybersecurity risk related to a CAV using Digital Twin, in accordance with some embodiments. At step 801, the digital twin platform collects real-time data from the monitoring module 201, the ECU update statues from the ECU update status module 127, and the CAV-CRS score from the CAV-CRS computation module 128. At step 802, the digital twin platform generates an updated CAV model. At step 803, the digital twin platform monitors the update statuses of each of the ECUs 167-173 and the CAV-CRS score until identified updates are installed. At step 804, the digital twin platform determines whether the CAV is updated. At step 805, the digital twin platform updates the CAV model based on identified PCIs. At step 806, the digital twin platform generates a modified CAV model. At step 807, the digital twin platform displays and sends the PCI and results to the CAV-CRS computation module 128 and to the insurance premium calculation module.

Figure 9:
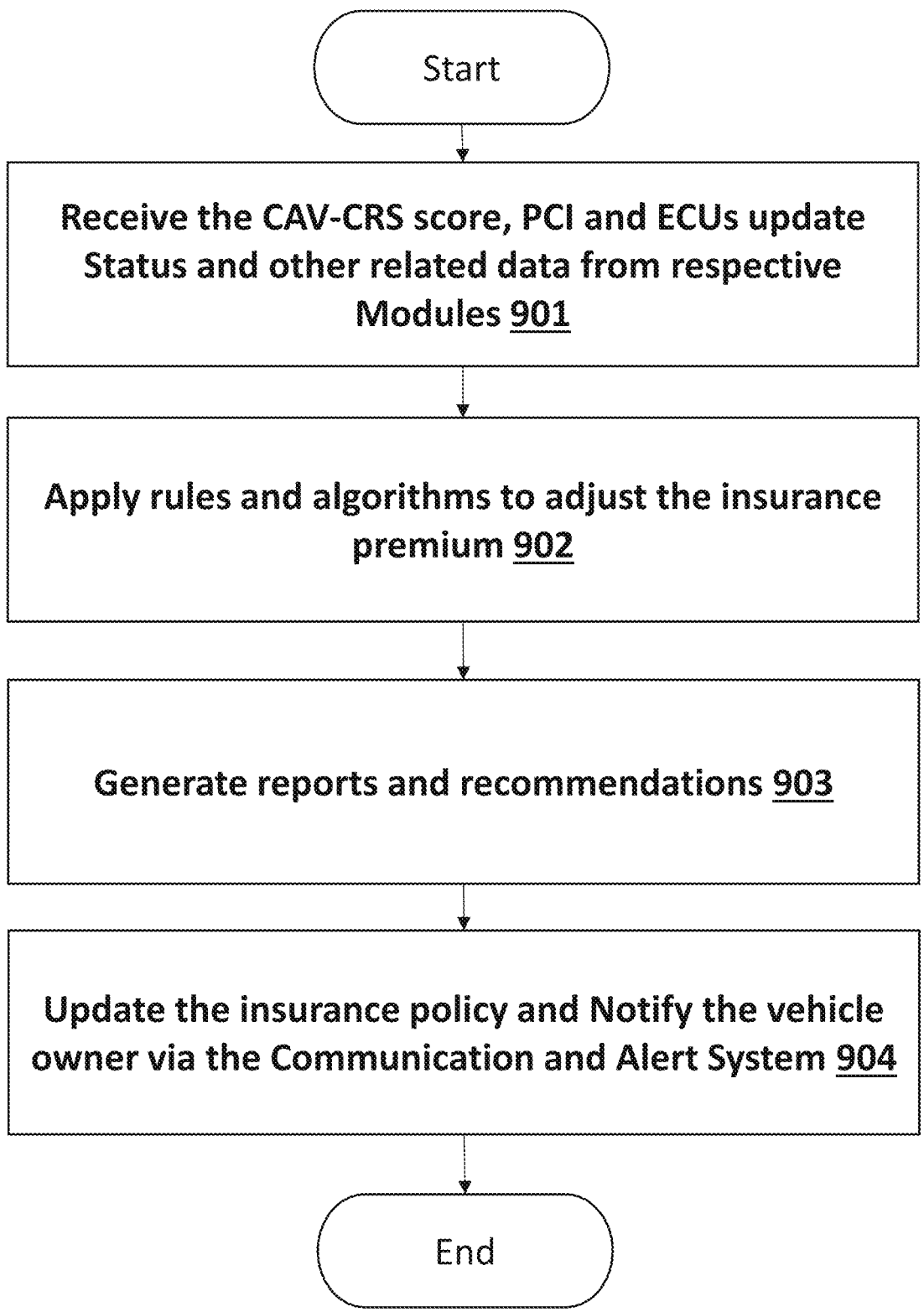
FIG. 9 is a flowchart of a method for monitoring and evaluating cybersecurity risk related to a CAV using Digital Twin, in accordance with some embodiments.

FIG. 9 is a flowchart of a method for monitoring and evaluating cybersecurity risk related to a CAV using Digital Twin, in accordance with some embodiments. At step 901, the insurance premium adjustment module 186 receives the CAV-CRS score, the PCIs, the ECU update status, and other related data from the respective modules. At step 902, the insurance premium adjustment module 186 applies rules and algorithms to adjust the insurance premiums. At step 903, the insurance premium adjustment module 186 generates reports and recommendations. At step 904, the insurance premium adjustment module 186 updates the insurance policy and notifies the vehicle owner via the communication and alert system.

Although the invention has been explained in relation to its preferred embodiment, it is to be understood that many other possible modifications and variations can be made without departing from the spirit and scope of the invention as hereinafter claimed. It is to be understood that the steps described may be performed in any order and/or any steps may be repeated without departing from the spirit and scope of the invention as hereinafter claimed.

What is claimed is:

1. A method for monitoring and evaluating cybersecurity risk of connected and autonomous vehicles, the method comprising:
    collecting, using at least one vehicle sensor, a real-time data associated with a vehicle;
    receiving, using a communication device, the real-time data from the at least one vehicle sensor;
    receiving, using the communication device, at least one update status associated with at least one electronic control unit associated with the vehicle;
    generating, using a processing device, a current vehicle model based on the real-time data and the at least one update status;
    generating, using the processing device, a vehicle cybersecurity risk score based on the real-time data and on the at least one update status;
    generating, using the processing device, virtual vehicle model based on the current vehicle model and the vehicle cybersecurity risk score;
    simulating, using the processing device, the activity of one or more cybersecurity threats acting upon the virtual vehicle model;
    simulating, using the processing device, a vehicle behavior of the virtual vehicle model in response to the simulated cybersecurity threats;
    generating, using the processing device, at least one predictive cybersecurity indicator based on the behavior of the virtual vehicle model's response to the one or more simulated cybersecurity threats; and
    adjusting, using the processing device, an insurance premium associated with the vehicle, the adjusting based on the at least one predictive cybersecurity indicator;
    wherein adjusting the insurance premium further comprises:
        calculating, using the processing device, an adjustment to the insurance premium based on the vehicle cybersecurity risk score, the at least one predictive cybersecurity indicator, and the at least one update status;
        generating, using the processing device, a report associated with the adjustment;
        generating, using the processing device, a recommendation associated with the adjustment;
        updating, using the processing device, an insurance policy associated with the vehicle; and
        transmitting, using the communication device, a notification to an owner associated with vehicle, the notification comprising the adjustment to the insurance premium.

2. The method of claim 1, wherein the real-time data comprises at least one of a vehicle operational data, an environmental data, a user-generated data, and a location of the vehicle.

3. The method of claim 1, wherein receiving the at least one update status associated with the at least one electronic control unit further comprises:
    receiving, using the communication device, data from the at least one electronic control unit, the data indicating a current firmware version of a firmware associated with the at least one electronic control unit;
    receiving, using the communication device, data from a manufacturer, the data indicating an updated firmware version associated with the at least one electronic control unit;
    analyzing, using the processing device, whether the current firmware version matches the updated firmware version; and
    computing, using the processing device, the update status associated with the at least one electronic control unit based on the analyzing.

4. The method of claim 3, wherein the at least one electronic control unit comprises at least one selected from an infotainment electronic control unit, a navigation electronic control unit, a tire pressure electronic control unit, a brake electronic control unit, an engine electronic control unit, a transmission electronic control unit, and a ventilations electronic control unit.

5. The method of claim 1, wherein the receiving the at least one update status further comprises:
    receiving, using the communication device, data from the at least one electronic control unit;
    preprocessing, using the processing device, the data;
    cleaning, using the processing device, the data; and
    converting, using the processing device, a format of the data.

6. The method of claim 1, wherein the simulating the at least one cybersecurity threat further comprises:
    simulating, using the processing device, at least one attack vector;
    evaluating, using the processing device, a vehicle response to the at least one attack vector; and
    identifying, using the processing device, at least one potential vulnerability based on the evaluating.

7. The method of claim 6, wherein the generating the at least one predictive cybersecurity indicator further comprises generating the at least one predictive cybersecurity indicator based on the at least one potential vulnerability.

8. A system for monitoring and evaluating cybersecurity risk of connected and autonomous vehicles, the system comprising:
- at least one vehicle sensor configured for collecting real-time data associated with a vehicle;
- a communication device configured for:
  - receiving the real-time data from the at least one vehicle sensor; and
  - receiving at least one update status associated with at least one electronic control unit associated with the vehicle; and
  - transmitting a notification to an owner associated with the vehicle, the notification comprising an adjustment to an insurance premium associated with the vehicle;
- a processing device communicatively coupled with the communication device, wherein the processing device is configured for:
  - generating a current vehicle model based on the real-time data and on the at least one update status;
  - generating a vehicle cybersecurity risk score based on the real-time data and on the at least one updated status;
  - generating virtual vehicle model based on the current vehicle model and vehicle cybersecurity risk score;
  - simulating one or more cybersecurity threats acting upon on the virtual vehicle model;
  - generating at least one predictive cybersecurity indicator based on the virtual vehicle model's behavior in response to the one or more cybersecurity threats;
  - adjusting the insurance premium associated with the vehicle, the adjusting based on the at least one predictive cybersecurity indicator;
  - calculating an adjustment to the insurance premium based on the vehicle cybersecurity risk score, the at least one predictive cybersecurity indicator, and the at least one update status;
  - generating a report associated with the adjustment;
  - generating a recommendation associated with the adjustment; and
  - updating an insurance policy associated with the vehicle.

9. The system of claim 8, wherein the real-time data comprises at least one of a vehicle operational data, an environmental data, a user-generated data, and a location of the vehicle.

10. The system of claim 8, wherein the communication device is further configured for:
- receiving data from the at least one electronic control unit, the data indicating a current firmware version of a firmware associated with the at least one electronic control unit;
- receiving data from a manufacturer, the data indicating an updated firmware version associated with the at least one electronic control unit; and the processing device is further configured for:
- analyzing whether the current firmware version matches the updated firmware version; and
- computing the update status associated with the at least one electronic control unit based on the analyzing.

11. The system of claim 8, wherein the at least one electronic control unit comprises at least one selected from an infotainment electronic control unit, a navigation electronic control unit, a tire pressure electronic control unit, a brake electronic control unit, an engine electronic control unit, a transmission electronic control unit, and a ventilations electronic control unit.

12. The system of claim 8 wherein:
- the communication device is further configured for:
  - receiving data from the at least one electronic control unit; and
- the processing device is further configured for:
  - preprocessing the data;
  - cleaning the data; and
  - converting a format of the data.

13. The system of claim 8, wherein the processing device is further configured for:
- simulating at least one attack vector;
- evaluating a vehicle response to the at least one attack vector; and
- identifying at least one potential vulnerability based on the evaluating.

14. The system of claim 13, wherein the processing device is further configured for generating the at least one predictive cybersecurity indicator based on the at least one potential vulnerability.

* * * * *